UNITED STATES PATENT OFFICE.

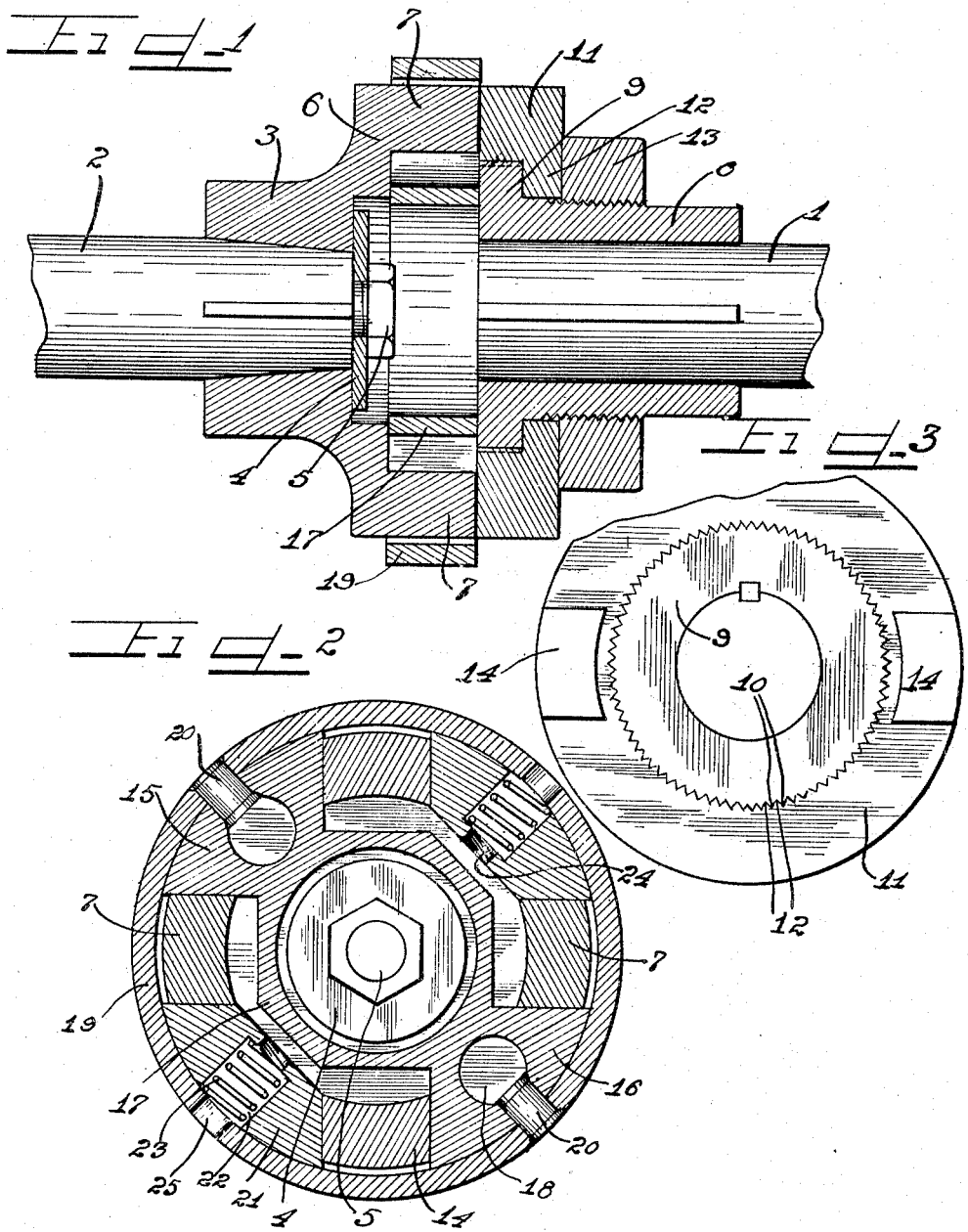

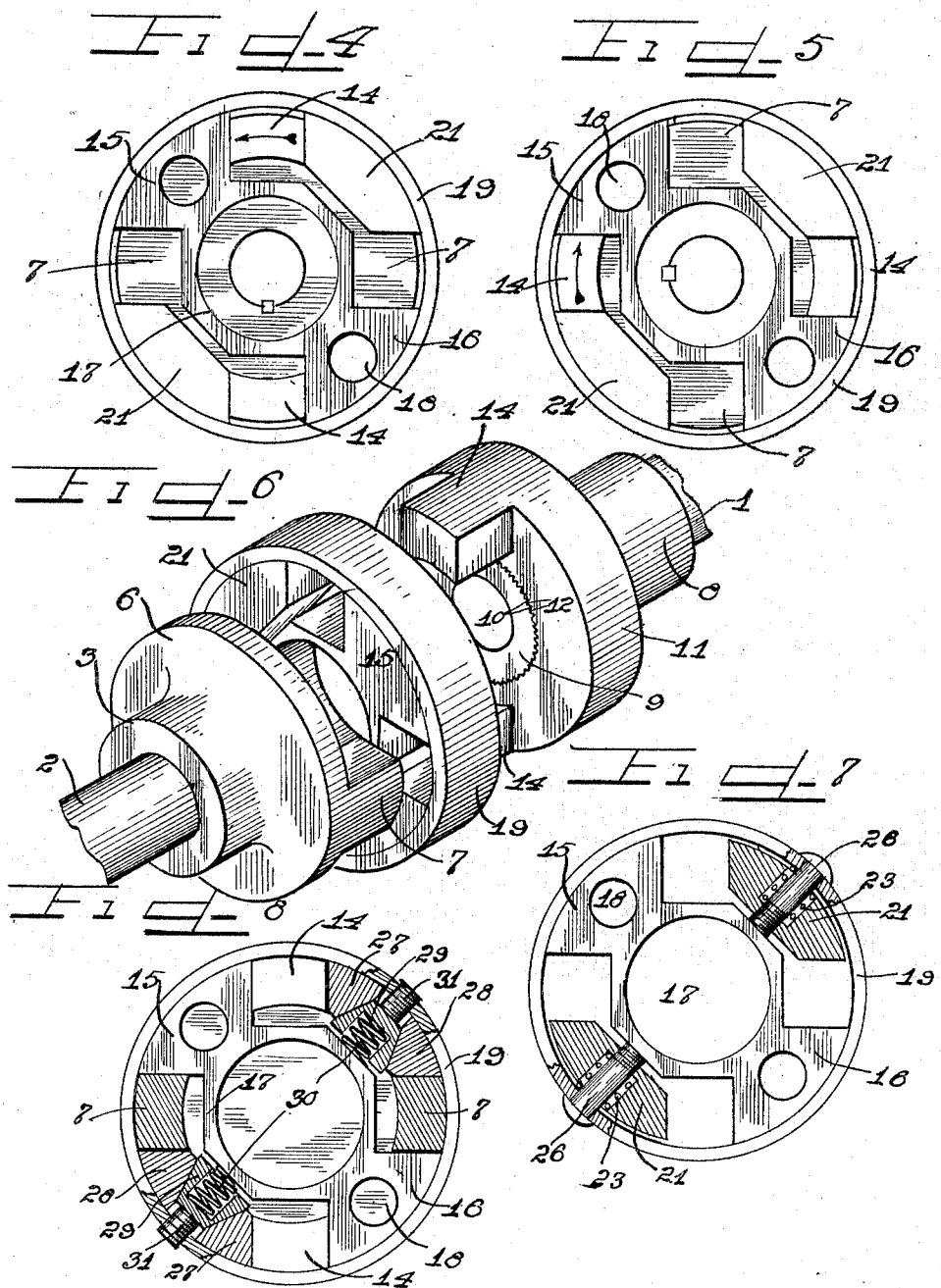

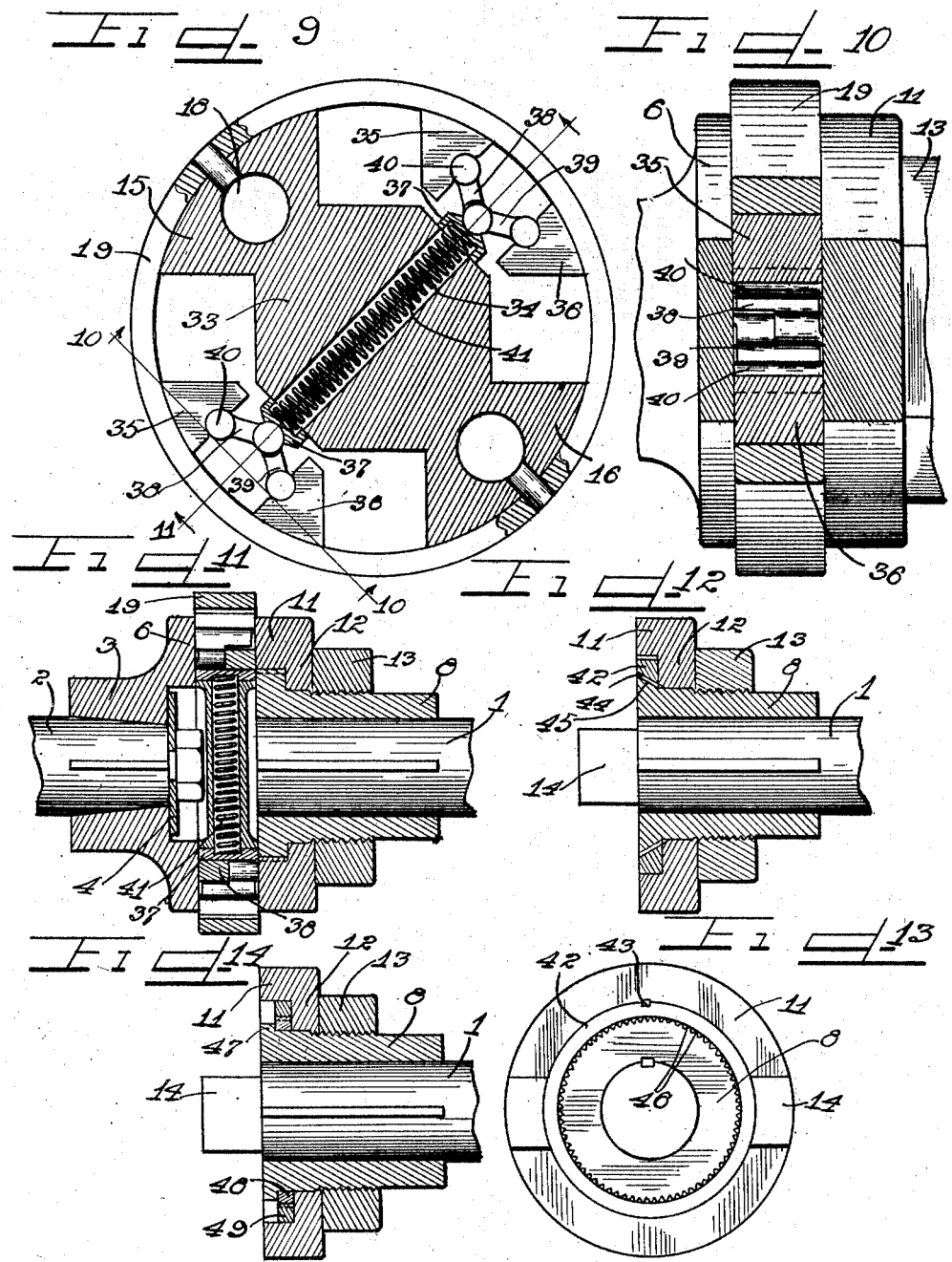

GEORGE T. RAYFIELD, OF CHICAGO, ILLINOIS.

UNIVERSAL SHAFT-COUPLING.

1,325,680.  Specification of Letters Patent.  Patented Dec. 23, 1919.

Application filed September 18, 1917. Serial No. 191,964.

*To all whom it may concern:*

Be it known that I, GEORGE T. RAYFIELD, a citizen of the United States, and a resident of the city of Chicago, in the county of Cook and State of Illinois, and whose post-office address is 4820 Cottage Grove avenue, have invented certain new and useful Improvements in Universal Shaft-Couplings; and I do hereby declare that the following is a full, clear, and exact description of the same, reference being had to the accompanying drawings, and to the numerals of reference marked thereon, which form a part of this specification.

This invention relates to improvements in shaft couplings.

It is an object of this invention to provide a coupling which may be used to connect shafts used for any purpose but more particularly adapted for use in connecting the magneto or pump shaft with a counter shaft driven from the engine.

It is an object of this invention to provide a coupling by means of which the magneto may be accurately timed without necessitating absolute accuracy in the construction of the parts.

It is also an object of this invention to provide a coupling in which the wear of the parts is automatically taken up and in which the tension is exerted on both jaws uniformly regardless of slight inaccuracies in the size of the various parts.

It is further an object of this invention to provide a coupling which is adapted to be used for either right or left hand shafts and in which the drive in either event is against a solid member.

The invention (in a preferred form) is illustrated in the drawings and hereinafter more fully described.

On the drawings:

Figure 1, is a longitudinal section of a coupling embodying my invention.

Fig. 2, is a vertical central section thereof with the parts assembled.

Fig. 3 is a face view of the coupling on the counter shaft.

Figs. 4 and 5 are face views of the central coupling member.

Fig. 6 is a view of the coupling members disassembled.

Fig. 7 is a section illustrating the manner of holding the segmental take up members retracted prior to assembling the coupler.

Fig. 8, is a section of the central member illustrating a modified form of take up mechanism.

Fig. 9 is a section of the central member illustrating another modified form of take up mechanism.

Fig. 10 is a section taken on line 10—10 of Fig. 9.

Fig. 11 is a section taken on line 11—11 of Fig. 9.

Fig. 12 is a section of a modified form of counter shaft coupling illustrating a modified form of timing mechanism.

Fig. 13 is a face view thereof.

Fig. 14 is a view of a further modified form of timing device.

As shown in the drawings:

1, indicates a counter or other shaft driven from the engine and 2, the magneto or other shaft to be driven therefrom.

Keyed on the magneto shaft 2 is a coupling member which is held from longitudinal movement by means of a washer 4 and set nut 5. The coupler member comprises a sleeve or shank 3, integral with which is a flange or disk 6, provided with two axial lugs 7. The said disk and lugs form one of the jaw members.

Keyed on the shaft 1 is a sleeve member 8, having a flange 9, provided with external teeth 10. A collar 11, fits over the flange 9, and is provided with a flange 12, to limit its forward movement. Said collar is provided with fine internal teeth 12 by means of which the same may be nicely adjusted relatively of the flange 9, and a clamp nut 13, is threaded on sleeve 8, and together with the interfitting teeth rigidly holds the collar 11, in any adjustment. Integral with the collar are two lugs or projections 14.

The central member or connector of the coupler is in effect a clamping member and comprises oppositely disposed segmental members 15—16, rigidly connected by a ring member 17, having square external faces. Each segment member is provided with an aperture 18 and a rivet aperture opening therefrom through the periphery thereof. A retaining ring 19, extends around the segments 15—16, and is rigidly secured thereto by rivets 20, the apertures 18, assisting in riveting the inner heads on the rivets.

Secured in the ring 19, are radially movable segment members 21, each of which is provided with a recess 22, in which is seated a spring 23. A threaded aperture 24, is provided in the segment in alinement with the recess 22, and an aperture 25, in the ring 19, for the purpose of receiving the screws 26, which act to hold the segments 21 retracted in place prior to assembling and after assembling are removed permitting the springs forcing the movable segments to automatically and tightly clamp the lugs 7 and 14 between the same and the fixed segments 15—16.

In the construction shown in Fig. 8, instead of the segments 21, a pair of wedge blocks 27—28 are provided which are forced oppositely to clamp the lugs 7—14 against the segments 15—16 by means of a wedge block 29 and spring 30 seated in a recess therein. The screws 31 are provided for the same purpose as set forth with respect to screws 26.

In the construction set forth in Figs. 9, 10 and 11, the segments 15—16, are connected by a solid member 33, provided with a passage 34, therethrough. The clamping jaws in this construction comprise two wedge members 35—36, each provided with a seat or recess therein as shown in Fig. 9. Pivotally connected to a cup member 37, are toggle levers 38—39, each provided with a head 40, adapted to engage in one of said seats in the wedge members 35—36. A coiled spring 41 is secured in the passage 34, and seats at its opposite ends in the cup members 37, and at all times exerts a pressure on said toggle arms 38—39, which in turn tends to force the jaws 35—36, inwardly in clamping position.

In the construction shown in Figs. 12—13, the timing mechanism is modified. The collar 11, is provided with a ring 42, of soft metal which is keyed to the collar by the key 43, and said ring is provided with a beveled face 44. The front of the sleeve 8, is also provided with a beveled face 45, and teeth 46, formed thereon. The jaws 14, are provided on the collar as in the other constructions. Fig. 14, shows a further modification of the timing device. In this construction the sleeve 8, is provided with a flange or collar 47, against which a ring 48, is engaged and rigidly secured to the sleeve 8, in any preferred manner. A ring 49, is also secured to the collar 11, and both of said rings have interfitting teeth thereon.

The operation is as follows:

In the construction shown in Figs. 1 to 7, the coupling member or jaw on the counter shaft 1, is inserted into the middle member with the lugs 14 in the apertures containing the arrows, Fig. 5, if a right hand drive and in the notches containing the arrows, Fig. 4, if a left hand drive. In either case it is to be noted that the drive is against the solid members 15—16, and not against the spring impelled members. After the coupler members or jaws are assembled with the central member or clamp, the screws 26, are removed and the springs 23, force the segments 21 inwardly until the jaws are tightly clamped in place in the clamping member.

In Fig. 8, the operation is the same except there are two wedge members in place of a single segment. This construction permits each wedge member to be independently forced to clamp the lugs 7—14, and thereby compensate for any slight inequalities in the thickness of said lugs.

In the construction shown in Figs. 9 to 11, the gripping tension of the wedge members 35—36 is exactly uniform as the one spring is used whereas in the other construction any inequality in the strength of the springs 21 or 30, would of necessity result in a different degree of pressure of the gripping segments or wedges. By the construction set forth in Figs. 9 to 11, an absolutely uniform tension is assured.

With regard to the timing device, it will be seen that if the magneto is not timed properly for best results, this may be accomplished by removal of the nut 13, and disengaging the teeth on the collar 11, from the teeth on the sleeve 8, after which the collar may be accurately adjusted for the correct timing of the magneto.

In the construction shown in Figs. 12 and 13, the effect is the same, but whereas in Fig. 7, it is necessary to completely remove the nut 13, in Fig. 12, the said nut 13, need only be loosened and the beveled faces disengaged and adjusted relatively to the proper position, after which the nut 13, is tightened, drawing the teeth on the sleeve 8, into the soft metal of the ring 42. Likewise by the construction shown in Fig. 14, the nut 13, need only be loosened a slight amount for the comparatively thin rings 48—49, to disengage after which the adjustment or timing is effected and the nut tightened. Inasmuch as the teeth are very fine, an exceedingly accurate timing device is provided.

From the construction shown, it will be seen that I have provided a universal joint and coupling whereby shafts out of alinement may be readily coupled without in any manner cramping the shafts or coupling owing to the construction and arrangement of the yielding spring wedge members.

It is obvious that many modifications may be made and details of construction may be varied through a wide range without departing from the principles of this invention and I therefore do not desire to limit this application for patent otherwise than necessitated by the prior art.

I claim as my invention:

1. A universal joint shaft coupling comprising a central clamping member, coupler jaws adapted to interfit therewith, means for clamping the coupler jaws to the central clamping member, and means for adjusting one of the jaws relatively of the other.

2. In a device of the class described a shaft, a sleeve thereon, a collar on said sleeve, interfitting teeth on said collar and sleeve and a clamp nut threaded on the sleeve for securing the collar and sleeve together.

3. A universal shaft coupling comprising a plurality of shafts, a coupler member on each shaft, an intermediate member, a radially movable member in the intermediate member for coupling the coupler members to the intermediate member and means for forcing the radially movable member into yielding clamping engagement.

4. A coupler and timing device comprising a member, a coupling jaw adapted to be secured thereto, and adjustable circumferentially thereon, an oppositely disposed coupling jaw, and an intermediate yieldable member into which the jaws slidably interfit.

5. A universal coupling comprising a pair of jaws having concentric lugs, a member having fixed members therein against which the lugs engage and spring impelled members between the fixed members to yieldably clamp the lugs between the same and fixed members.

6. In a device of the class described oppositely disposed coupling members, one constructed of a plurality of parts having interfitting teeth adapting the same to be adjusted relatively of the other member, an axially movable locking means for securing said parts together, and an intermediate member adapted to connect the coupler members.

7. A coupler comprising a pair of jaws and an intermediate connecting member therefor comprising a ring, segment members rigidly secured to the ring, radially movable members between the segment members and a spring exerting tension thereon to force the same radially to clamp the jaws between the rigid and radially movable segment members.

8. A universal shaft coupling comprising in combination with the shafts to be coupled, a sleeve or hub on each shaft, a jaw connected with each hub, a member into which the jaws interfit and tension members in said member adapted to hold the jaws in place in said member.

9. In a timing coupler, a shaft, a sleeve thereon, teeth on said sleeve, a collar member having teeth thereon adapted to mesh with the teeth on the sleeve, a nut threaded on the sleeve to clamp the collar and sleeve together in any relative adjustment, outwardly directed lugs on said collar, a second shaft, a sleeve thereon, a disk integral with said sleeve and outwardly directed lugs thereon connected with the lugs of the collar to afford a flexible driving connection between the shafts.

10. In a timing coupler, a shaft, a sleeve thereon, teeth on said sleeve, a collar member having teeth thereon adapted to mesh with the teeth on the sleeve, a nut threaded on the sleeve to clamp the collar and sleeve together in any relative adjustment and outwardly directed lugs on said collar.

11. In a timing coupler, a shaft, a sleeve thereon, a flange on said sleeve having teeth, a collar member having teeth thereon adapted to interfit with the teeth on the flange, a nut threaded on the sleeve to clamp the collar and sleeve together in any relative adjustment, outwardly directed lugs on said collar, a second shaft, a sleeve thereon, a disk integral with said sleeve, outwardly directed lugs thereon and an intermediate member having fixed and radially movable members therein adapted to yieldingly receive the lugs therebetween.

12. A universal shaft coupling comprising coupler jaws each having axially directed lugs, a clamping member having fixed members thereon and radially movable members and means for constantly impelling the radially movable members into operative engagement with said lugs and said fixed members.

13. A shaft coupling comprising two shafts, a flanged hub mounted on each shaft, each flange having a plurality of jaws, an intermediate member, a radially movable member, an inclosing member and a resilient element to constantly urge the radially movable member inwardly.

14. A shaft coupling comprising two shafts, a flanged hub mounted on each shaft, each flange having a plurality of jaws, an intermediate member, a plurality of radially movable members, an inclosing member, and resilient elements to constantly urge the radially movable members inwardly.

15. A shaft coupling comprising two shafts, a flanged hub mounted on each shaft, each flange having a plurality of jaws, an intermediate member having an inclosing member fixed thereto, radially movable members and means to constantly urge the respective movable members inwardly.

16. In a shaft coupling, the combination of two shafts, a flanged hub mounted on each shaft, each flange having a plurality of jaws, with an intermediate member, a plurality of radially movable members, an inclosing member, and resilient means to constantly urge the respective radially movable members inwardly.

17. In a shaft coupling, the combination of an intermediate member, an inclosing member fixed thereto, a plurality of radially movable members and resilient elements to constantly urge the respective radially movable members inwardly, with two shafts, a flanged hub mounted on each shaft, each flange having a plurality of jaws for engagement with the intermediate member positioned between the flanges, the jaws being capable of entering openings between the intermediate member and the radially movable members and resilient elements to constantly urge the radially movable members inwardly.

18. In a device of the class described, a pair of oppositely disposed coupler heads, axially directed members integral therewith, and an intermediate connector comprising fixed and radially movable members adapted to grip the aforesaid members therebetween.

In testimony whereof I have hereunto subscribed my name in the presence of two subscribing witnesses.

GEORGE T. RAYFIELD.

Witnesses:
   CHARLES W. HILLS, Jr.,
   EARL M. HARDINE.